(12) United States Patent
Heimbuch et al.

(10) Patent No.: US 10,919,586 B2
(45) Date of Patent: Feb. 16, 2021

(54) VEHICLE SHIPPING POSITION TO APPLICATION POSITION CONVERSION

(71) Applicants: Deere & Company, Moline, IL (US); Dewaine Kautsch, Jefferson City, MO (US)

(72) Inventors: Benjamin J. Heimbuch, Waterloo, IA (US); Jeremy P. L'Heureux, Waterloo, IA (US); Daniel Garvin, Waterloo, IA (US); Dewaine Kautsch, Jefferson City, MO (US)

(73) Assignee: DEERE & COMPANY, Moline, IL (US)

( * ) Notice: Subject to any disclaimer, the term of this patent is extended or adjusted under 35 U.S.C. 154(b) by 343 days.

(21) Appl. No.: 15/909,276

(22) Filed: Mar. 1, 2018

(65) Prior Publication Data
US 2019/0270489 A1 Sep. 5, 2019

(51) Int. Cl.
  *B62D 55/084* (2006.01)
  *B62D 55/065* (2006.01)
  (Continued)

(52) U.S. Cl.
  CPC ......... *B62D 55/084* (2013.01); *B62D 55/065* (2013.01); *B62D 55/10* (2013.01); *B62D 55/135* (2013.01); *B62D 55/32* (2013.01)

(58) Field of Classification Search
  CPC .............. B62D 55/065; B62D 55/0655; B62D 55/084; B62D 55/0847; B62D 55/10; B62D 55/135; B62D 55/32
  See application file for complete search history.

(56) References Cited

U.S. PATENT DOCUMENTS 4,262,764 A 4/1981 Kraus
2001/0025732 A1 10/2001 Lykken et al.
(Continued)

FOREIGN PATENT DOCUMENTS

WO 2017139356 A2 8/2017

OTHER PUBLICATIONS

German Search Report, German Patent & Trademark Office, dated Aug. 14, 2019, 11 pages.

*Primary Examiner* — Joseph M Rocca
*Assistant Examiner* — Maurice L Williams
(74) *Attorney, Agent, or Firm* — Taft Stettinius & Hollister LLP; Stephen F. Rost

(57) ABSTRACT

A work machine includes a frame including an axle and an arm, a track undercarriage assembly including an undercarriage assembly connected to the arm, a drive assembly operably attached to the axle, and a track belt mounted on the drive assembly. The undercarriage assembly and the drive assembly are each configured for lateral adjustment relative to a longitudinal centerline of the frame from a first position to a second position. The drive assembly includes a drive sprocket that is assembled with the axle in a first configuration to laterally adjust the drive assembly towards the first position and a second configuration to laterally adjust the drive assembly towards the second position. The undercarriage assembly includes an undercarriage frame attached to the arm, wherein the undercarriage frame and the arm are adjustably coupled to allow the undercarriage frame to be movably adjusted between the first and the second positions.

14 Claims, 7 Drawing Sheets

(51) Int. Cl.
*B62D 55/32* (2006.01)
*B62D 55/135* (2006.01)
*B62D 55/10* (2006.01)

(56) References Cited

U.S. PATENT DOCUMENTS

| | | |
|---|---|---|
| 2009/0321151 A1 | 12/2009 | Archambault et al. |
| 2015/0136497 A1* | 5/2015 | Morin .................... B62D 55/04 180/9.5 |
| 2017/0305483 A1 | 10/2017 | Rehberg |
| 2018/0050746 A1* | 2/2018 | Lubben ................ B62D 55/084 |
| 2019/0126980 A1* | 5/2019 | Johnson ................ B62D 11/20 |

\* cited by examiner

VEHICLE SHIPPING POSITION TO APPLICATION POSITION CONVERSION

FIELD OF THE DISCLOSURE

The present disclosure relates to a work machine, and in particular to an adjustable track undercarriage assembly for the work machine.

BACKGROUND OF THE DISCLOSURE

Tractors and other work machines include one or more ground-engaging mechanisms for propelling the machine along a ground or underlying surface. In many cases, these mechanisms include one or more wheels. In other machines, these mechanisms may include one or more track assemblies. Many of these machines are shipped to a customer in a narrow shipping configuration to save packaging and shipping costs. However, these machines in a narrow shipping configuration require significant machine rework to reconfigure the machines into a wider working or application position for actual use by the consumer. Typically, the drivetrain and the hydraulic oil system of this machine is split or opened, the fluid drained from these systems, and then the machine is reconfigured into the working position. During this reconfiguration, the oil cavity is opened or split thereby exposing the hydraulic oil system to possible contamination and delay in use of the machine. Further, each time the machine is adjusted to a new working or application position, the drivetrain and hydraulic oil systems are opened thereby increasing the potential for contamination and delay in use of the machine. Moreover, the cost is relatively high and the labor required must be highly skilled.

Thus there is a need for improvement for adjustable track undercarriage assembly for work machines.

SUMMARY

According to one embodiment of the present disclosure, a work machine comprises a frame including an axle and an arm, a track undercarriage assembly including an undercarriage assembly connected to the arm, a drive assembly operably attached to the axle, and a track belt mounted on the drive assembly, wherein the undercarriage assembly and the drive assembly are each configured for lateral adjustment relative to a longitudinal centerline of the frame from a first position to a second position.

In one example, the axle includes an axle shaft and an axle flange, and the drive assembly includes a drive sprocket, wherein the drive sprocket includes an inner ring configured to attach to the axle flange, an outer ring configured to rotationally drive the track belt, and a collar that spans between the inner ring and the outer ring.

In a second example, the drive sprocket is assembled in a first configuration such that the collar extends towards the axle shaft to laterally adjust the drive assembly towards the first position.

In a third example, the drive sprocket is assembled in a second configuration such that the collar extends away from the axle shaft to laterally adjust the drive assembly towards the second position.

In a fourth example, the drive assembly includes a spacer ring positioned between the inner ring of the drive sprocket and the axle flange to laterally adjust the drive assembly. In one form, the spacer ring includes a first ring coupled to a second ring, wherein the first ring is sized to rest against a first face of the inner ring and the second ring is sized to rest against the axle. In another refinement, the spacer ring is configured to incrementally adjust the drive assembly.

In a fourth example, the track undercarriage assembly includes a first track undercarriage assembly opposite a second track undercarriage assembly, the first track belt configured to be moved to the second track location, and the second track belt configured to be moved to the first track location.

In a fifth example, the undercarriage assembly includes an undercarriage frame configured to attach to the arm of the frame, wherein the undercarriage frame and the arm are adjustably coupled to allow the undercarriage frame to be movably adjusted between the first position and the second position. In one refinement, the arm includes a plurality of arm holes and the undercarriage frame includes a guide arm having a plurality of undercarriage holes, and a plurality of fasteners configured to connect the arm to the guide arm through the plurality of arm holes and the plurality of the undercarriage holes to laterally adjust the position of the undercarriage frame relative to the arm.

According to another embodiment of the present disclosure, a track undercarriage assembly for coupling to a frame of a work machine comprises a track belt, a drive assembly configured to receive the track belt, the drive assembly adjustably coupled to the frame, the drive assembly configured for lateral adjustment from a first position to a second position relative to a longitudinal centerline of the work machine; and an undercarriage assembly adjustably coupled to the frame, the undercarriage assembly configured for lateral adjustment from the first positon to the second position relative to the longitudinal centerline of the work machine.

In one example of this embodiment, the drive assembly includes a drive sprocket, wherein the drive sprocket includes an inner ring configured to attach to an axle of the frame, an outer ring configured to rotationally drive the track belt, and a collar that spans between the inner ring and the outer ring.

In a second example, the drive sprocket is assembled in a first configuration such that the collar extends towards the axle to laterally adjust the drive assembly towards the first position.

In a third example, the drive sprocket is assembled in a second configuration such that the collar extends away from the axle to laterally adjust the drive assembly towards the second position.

In a fourth example, the drive assembly includes a spacer ring positioned between the inner ring of the drive sprocket and the axle to laterally adjust the drive assembly. In one form, the spacer ring includes a first ring coupled to a second ring, wherein the first ring is sized to rest against a first face of the inner ring and the second ring is sized to rest against the axle. In another refinement, the spacer ring is configured to incrementally adjust the drive assembly.

In a fifth example, the track belt includes a first track belt opposite a second track belt, the first track belt configured to be moved to the second track location, and the second track belt configured to be moved to the first track location.

In a sixth example, the undercarriage assembly includes an undercarriage frame configured to attach to an arm of a frame of the work machine in a first configuration or a second configuration, wherein the undercarriage frame and the arm are adjustably coupled to allow the undercarriage frame to be movably adjusted between the first position and the second position. In one refinement, the arm includes a plurality of arm holes and the undercarriage frame includes a guide arm having a plurality of undercarriage holes, and a plurality of fasteners configured to connect the arm to the guide arm through the plurality of arm holes and the plurality of the undercarriage holes to laterally adjust the position of the undercarriage frame relative to the arm.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
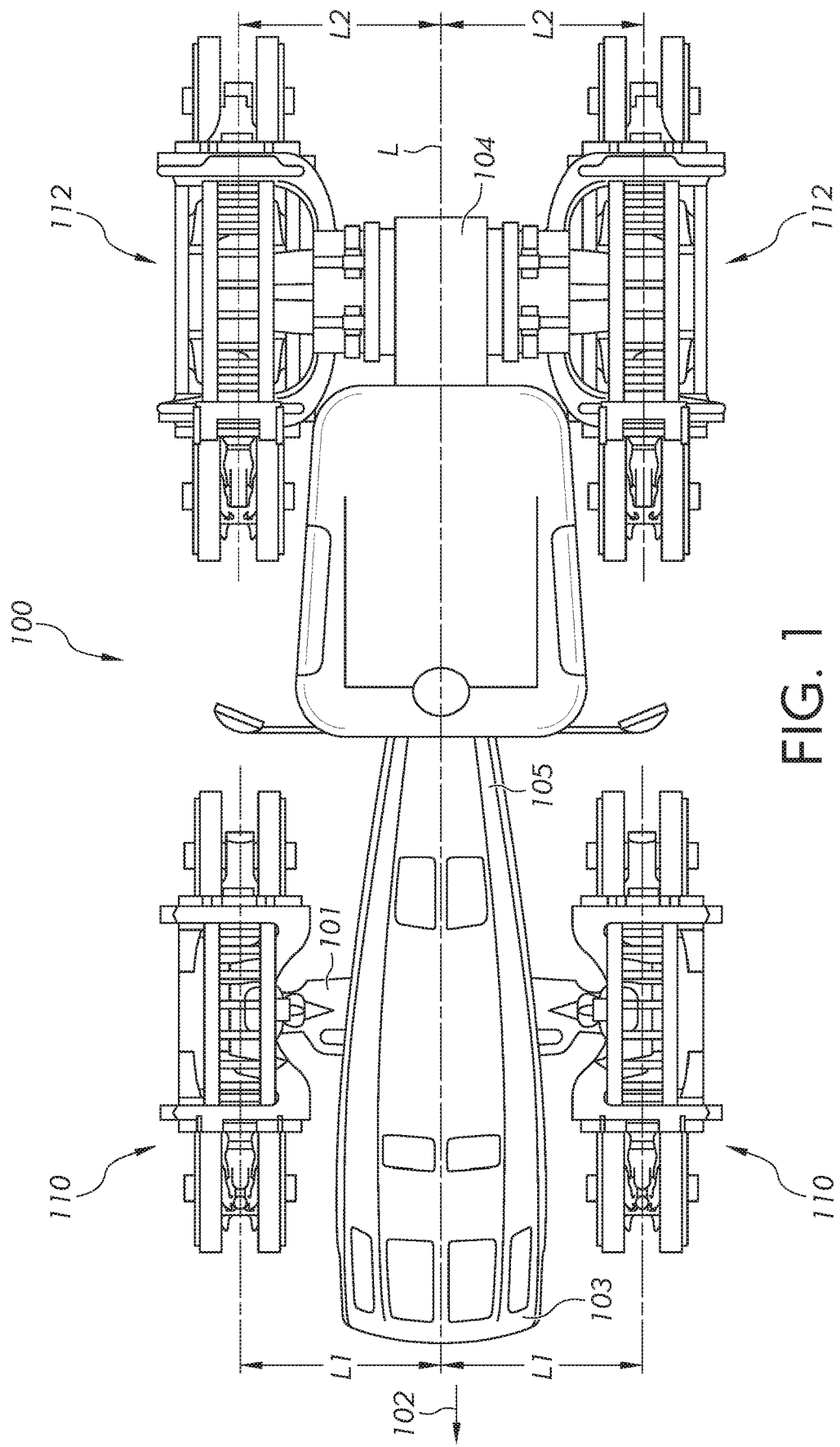
FIG. 1 is a top view of a work machine in a first position.
Figure 2:
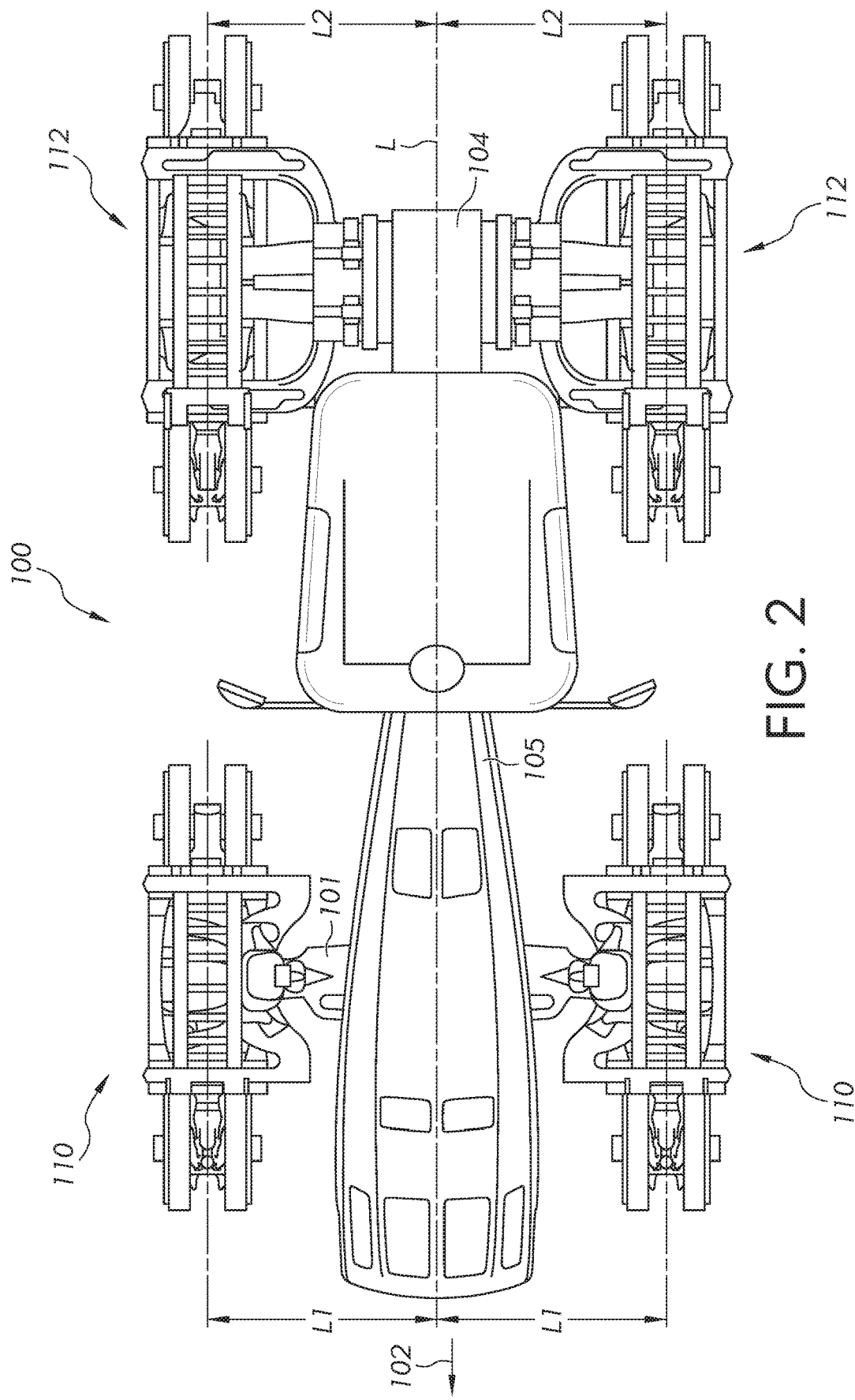
FIG. 2 is a top view of the work machine of FIG. 1 in a second position.

Referring now to FIG. 1, a work machine or tractor 100 is shown in a first or shipping position. Referring now to FIG. 2, the work machine or tractor 100 is shown in a second or application position that is wider than the first position. The work machine 100 may move in a forward direction of travel as indicated by arrow 102 to perform the work function. The work machine 100 may include a frame 104 supported by a first ground-engaging mechanism 110 and a second ground-engaging mechanism 112. The first and second ground-engaging mechanisms 110 and 112, respectively, are illustrated as track undercarriage assemblies. The first ground-engaging mechanism or track undercarriage assembly 110 includes its own independently-driven track belt (not illustrated), and the second ground-engaging mechanism or track undercarriage assembly 112 includes its own independently-driven track belt 114 (illustrated in FIG. 4). The first and second track undercarriage assemblies 110 and 112, respectively, are configured for first lateral adjustment L1 and second lateral adjustment L2, respectively, relative to a longitudinal centerline L of the frame 104 from the first position to the second position and from the second position to the first position, as described in more detail below. The first lateral adjustment L1 is less than the second lateral adjustment L2.

The frame 104 includes a front axle 101 and a front arm (not illustrated) that extend from the frame 104. The front axle 101 includes an axle shaft and an axle flange that extends from an outer end of the axle shaft. The frame 104 also includes a rear axle 106 and a rear arm 108 that extend from the frame 104 wherein the rear axle 106 and the rear arm 108 are similar to the front axle 101 and the front arm, respectively. The rear axle 106 includes an axle shaft 107 and an axle flange 109 that extends from an outer end 111 of the axle shaft 107.

The first track undercarriage assembly 110 is coupled to the front axle 101 at a front portion 103 of the work machine 100. The second track undercarriage assembly 112 is coupled to the rear axle 106 at a rear portion 105 of the work machine 100.

A cab assembly (not illustrated) may be mounted to the frame 104 of the work machine 100. The cab assembly may include an operator's seat (not shown) and controls (not shown) for operating the work machine 100. The plurality of controls may include joysticks, levers, wheels, push buttons, switches, knobs, dials, and any other known control mechanism for controlling a function of the machine 100. The seat may be provided for a tractor operator to face the front portion 103 of the work machine 100 while operating or controlling the work machine 100. In addition, an engine compartment (not illustrated) may be provided for housing an engine, prime mover, motor, or other known power-generating device. Further, an engine compartment that houses an engine may be supported by the frame 104 wherein the engine can provide the motive power for operating any implements based on the operator's input to the controls 110. While the work machine 100 is shown and described as a tractor, this disclosure is not limited in application to tractors. This disclosure is also applicable to any size of work machine and the tractor is only referenced herein as one example of a type of work machine. Accordingly, a compact track loader, skid steer loader, excavator, crawler, cotton picker, harvester, combine harvester, tow behind equipment, a two-track machine, or any other similar work machine is considered herein that includes track belts.

In the embodiment of FIG. 1, a four-track work machine 100 is shown. Here, the first track undercarriage assembly 110 is mounted to the front axle and the second track undercarriage assembly 112 is mounted to the rear axle 106 in a similar fashion. Likewise, another track undercarriage assembly 110 may be mounted on the opposite side of the work machine 100 to the front axle, and another track undercarriage assembly 112 may be mounted on the opposite side of the work machine 100 to the rear axle. In this example, there are four total track assemblies mounted to the work machine 100. One of the challenges here is utilizing a four track belt system for a shipping or first position and an application or second position. In a shipping or first position illustrated in FIG. 1, it may be desirable to adjust the width of the track undercarriage assemblies 110 and 112 to a narrow position to conserve space for shipping costs, transportation, packaging, and/or field use, to name a few reasons. In a wider application or second position illustrated in FIG. 2, it may be desirable to adjust the width of the first and second track undercarriage assemblies 110 and 112 to a wider width for a field use or second position. The second position illustrated in FIG. 2 is the largest or widest width between the first and second track undercarriage assemblies 110 and 112, respectively. The first track undercarriage assemblies 110 and the second track undercarriage assemblies 112 are each adjustable to a width that is between the first position and the second position with the addition of a spacer ring as described below.

In many conventional systems, a track undercarriage assembly may bolt directly to a drive hub of a front axle with appropriate bearing support. This fixed system does not permit any adjustability of the width between track belts at either the front or rear axle. Moreover, with many conventional systems, one must remove an entire track undercarriage assembly and belt, drain fluid from an axle housing, mount a large cast metal spacer ring to the axle, and then reattach the track undercarriage assembly and fill the axle housing with fluid. Wet joints and the like often increase the complexity and time it takes to make any adjustments to the space between track belts. Further, adjusting or setting belt tension can be difficult with conventional track assemblies.

Figure 3:
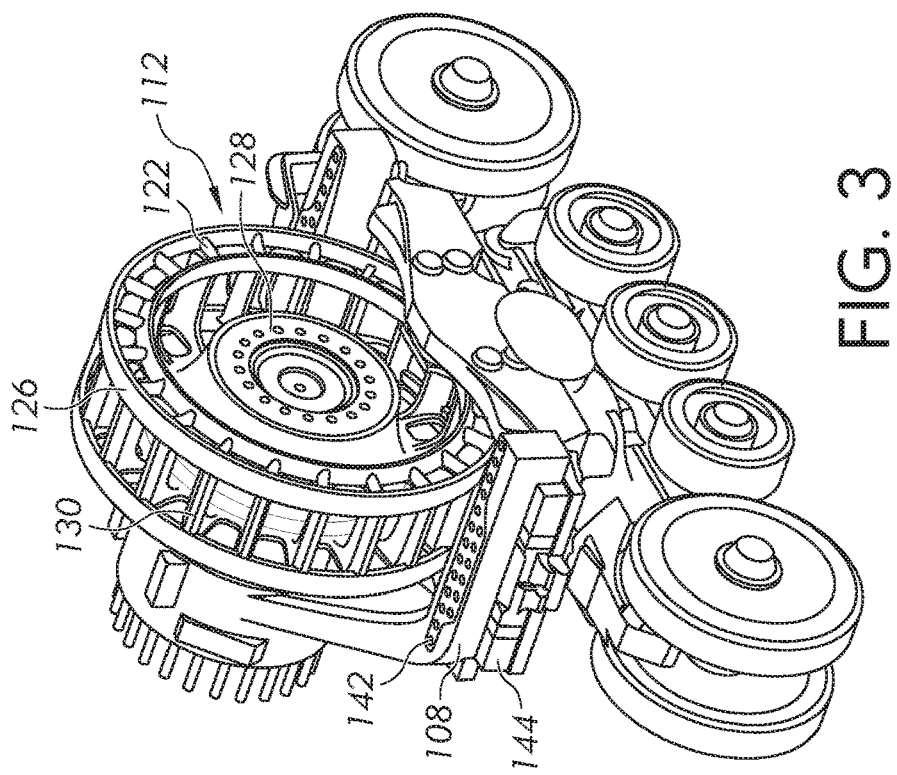
FIG. 3 is a rear perspective view of a track undercarriage assembly without a track belt assembled thereon of the work machine of FIG. 1.
Figure 4:
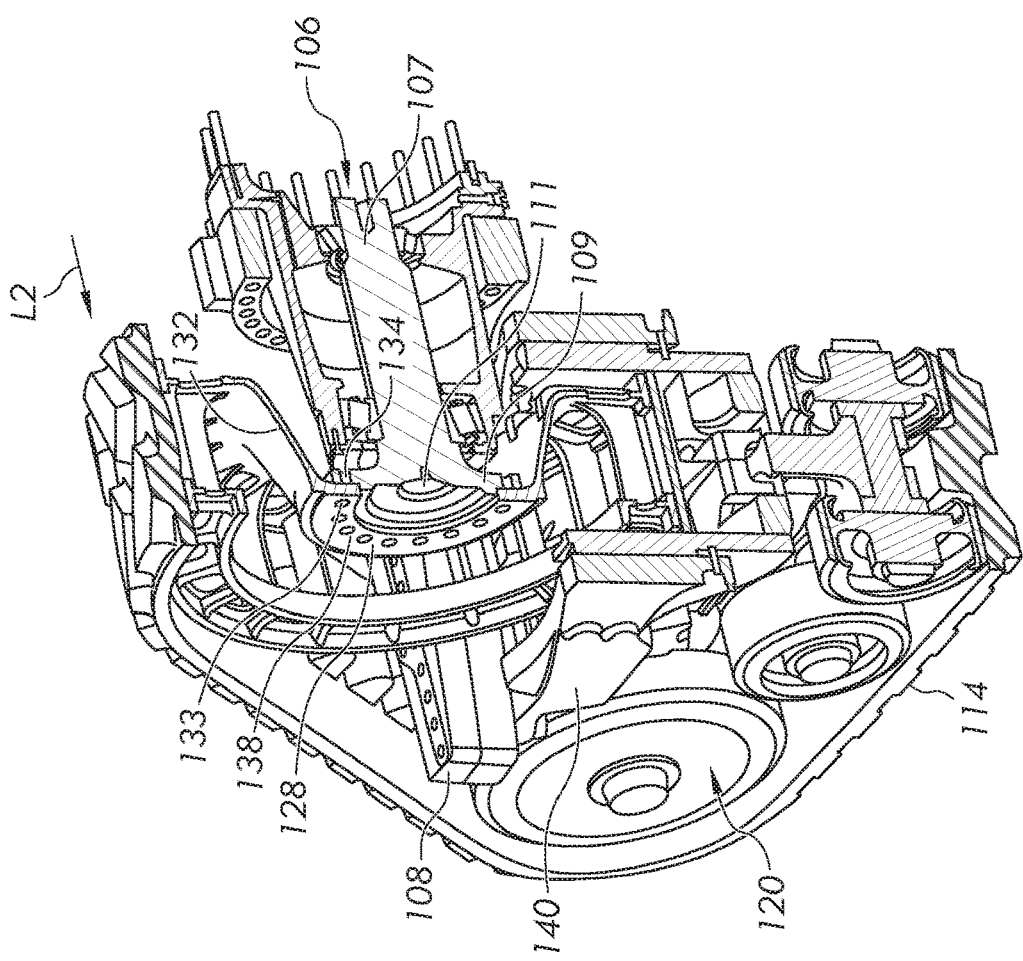
FIG. 4 is a cross-sectional view of the track undercarriage assembly of FIG. 3.

In FIGS. 3 and 4, the second track undercarriage assembly 112 is illustrated wherein the first track undercarriage assembly 110 is similar to the second track undercarriage assembly 112. An embodiment of the second track undercarriage assembly 112 is shown as a self-contained unit or dry joint that allows for better adjustability than conventional systems. Moreover, the first and second track undercarriage assemblies 110 and 112 can be shipped in a narrow configuration that is optimized for cost savings and for relatively little to no cost can be reconfigured to a wider configuration with very little labor and few tools.

The second track undercarriage assembly 112 includes an undercarriage assembly 120 connected to the rear arm 108, a drive assembly 122 operably attached to the rear axle 106, and the track belt 114 mounted on the drive assembly 122. The undercarriage assembly 120 and the drive assembly 122 are each configured for lateral adjustment, as indicated by arrow L2, relative to the longitudinal centerline L of the frame 104 from the first position in FIG. 1 to the second position in FIG. 2 and any position therebetween. Moreover, the undercarriage assembly 120 and the drive assembly 122 are laterally adjusted the same or about the same distance.

The drive assembly 122 includes a drive sprocket 126. The drive sprocket 126 includes an inner ring 128 configured to attach to the axle flange 109, an outer ring 130 configured to rotationally drive the track belt 114, and a collar 132 that spans between and connects the inner ring 128 and the outer ring 130. The rear axle 106 includes an axle shaft 107 and an axle flange 109 that extends from an outer end 111 of the axle shaft 107. The axle shaft 107 may be rotationally driven to drive the drive assembly 122 wherein the axle flange 109 engages and rotates the inner ring 128. In one embodiment, the drive assembly 122 includes a plurality of fasteners (not illustrated) having a length to extend through the inner ring 128 and the axle flange 109 to mount the drive sprocket 126 onto the rear axle 106. In this embodiment, the inner ring 128 includes a plurality of apertures 133 and the axle flange 109 includes a plurality of apertures 134 wherein the apertures 133 and 134 are sized to receive the plurality of fasteners and arranged to align with one another to attach the inner ring 128 to the axle flange 109 and mount the drive sprocket 126 onto the rear axle 106. Further, the inner ring 128 includes a first face 136 opposite a second face 138 wherein the first face 136 is configured for attachment to the axle flange 109 when the second track undercarriage assembly 112 is in the first position and the second face 138 is configured for attachment to the axle flange 109 when the second track undercarriage assembly 112 is in the second position.

Figure 8:
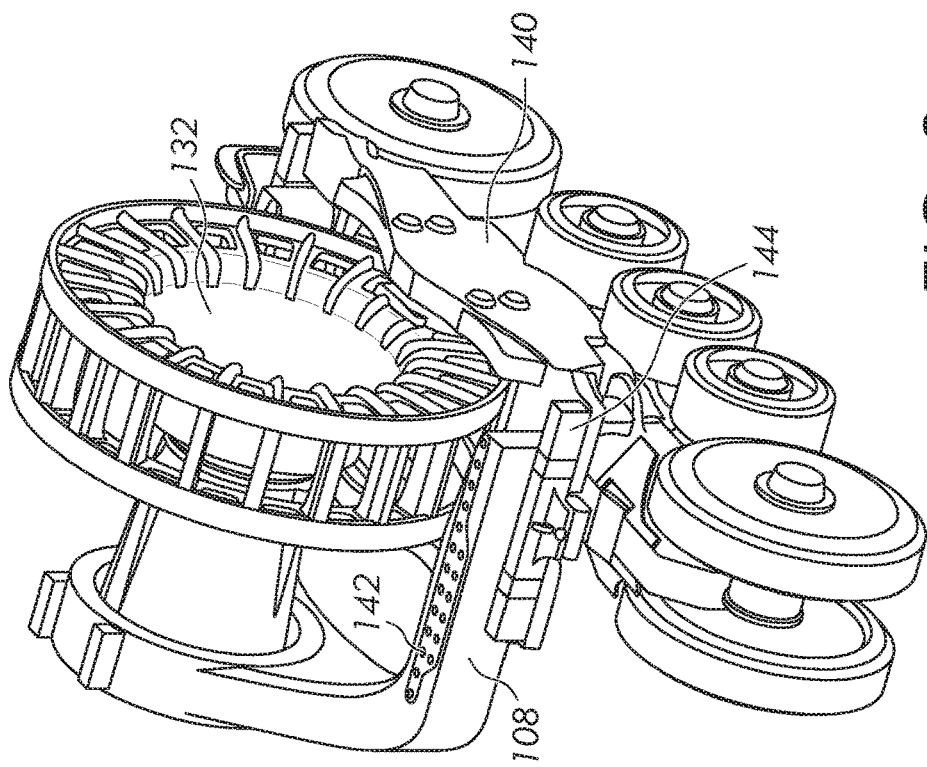
FIG. 8 is a rear perspective view of the track undercarriage assembly without a track belt assembled thereon of the work machine of FIG. 1 in the second position.
Figure 9:
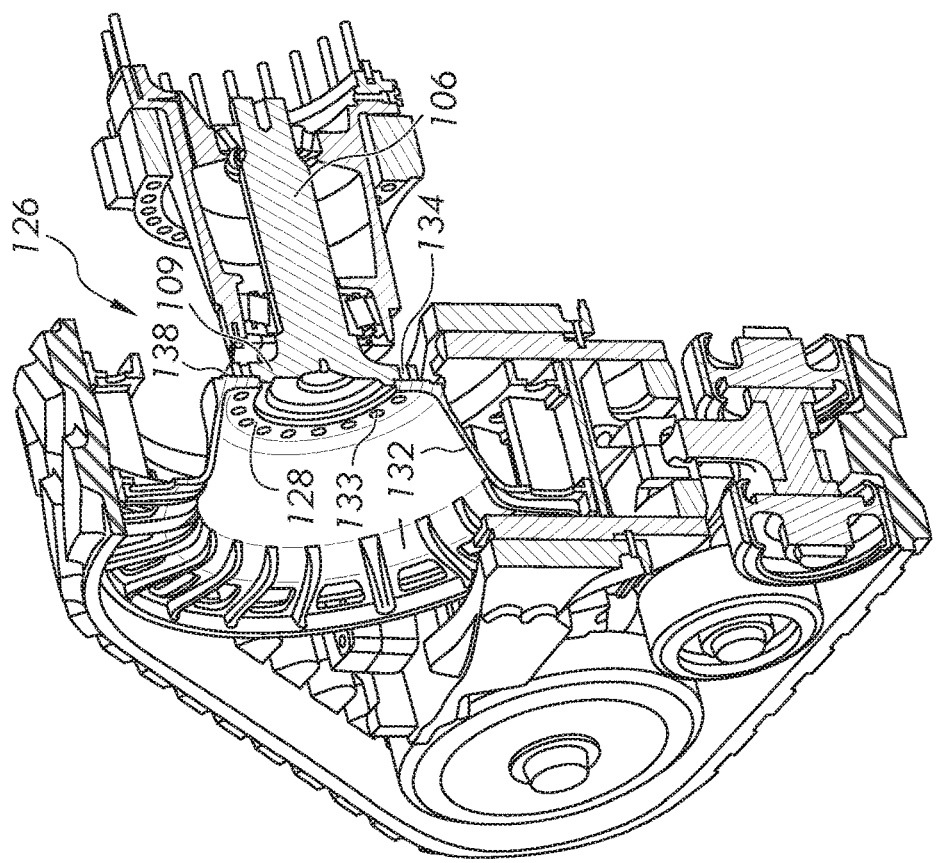
FIG. 9 is a cross-sectional view of the undercarriage assembly of FIG. 8 with a track belt assembled thereon.

The collar 132 spans between and connects the inner ring 128 to the outer ring 130. The collar 132 is sized to receive a spacer ring 160 as described in other embodiments. The drive sprocket 126 can be assembled in a first configuration as illustrated in FIGS. 1, 3, and 4, such that the collar 132 extends towards the axle shaft 107 to laterally adjust the drive assembly 122 to the first position. As described below, the collar 132 can extend towards the axle shaft 107 and is configured to receive a spacer ring to laterally adjust the drive assembly 122 to a wider or larger position than the first position but not as wide as the second position wherein the drive assembly 122 does not include a spacer ring. The drive sprocket 126 can be assembled in a second configuration as illustrated in FIGS. 8 and 9 such that the collar 132 extends away from the axle shaft 107 to laterally adjust the drive assembly 122 to the second position.

As discussed above, the second track undercarriage assembly 112 includes the undercarriage assembly 120. The undercarriage assembly 120 includes an undercarriage frame 140 configured to attach to the rear arm 108 of the frame 104. The undercarriage assembly 120 may further include one or more bogey wheels and idler wheels. The undercarriage frame 140 and the rear arm 108 are adjustably coupled to allow the undercarriage frame 140 to be movably or slidably adjusted between the first position illustrated in FIGS. 1, 3, and 4 and the second position illustrated in FIGS. 8 and 9 and other positions illustrated in FIGS. 5, 6, and 7. The undercarriage frame 140 can include a guide arm 144 to slidably engage the rear arm 108 to facilitate the undercarriage frame 140 being moved from the first position to the second position and vice versa. In the illustrated embodiment, the rear arm 108 includes a plurality of arm holes 142 and the guide arm 144 includes a plurality of undercarriage holes (not illustrated) and the undercarriage assembly 120 includes a plurality of fasteners (not illustrated) configured to connect the rear arm 108 to the guide arm 144 through the plurality of arm holes 142 and the plurality of the undercarriage holes to laterally adjust the position of the undercarriage frame 140 relative to the rear arm 108.

Figure 5:
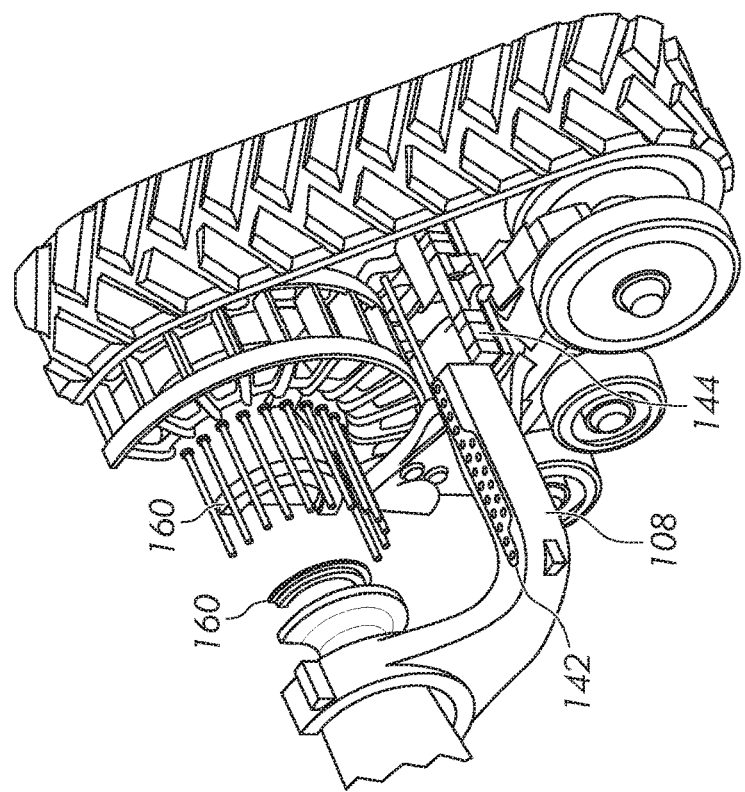
FIG. 5 is an exploded cross-sectional view of the track undercarriage assembly of FIG. 3 with a spacer ring.
Figure 6:
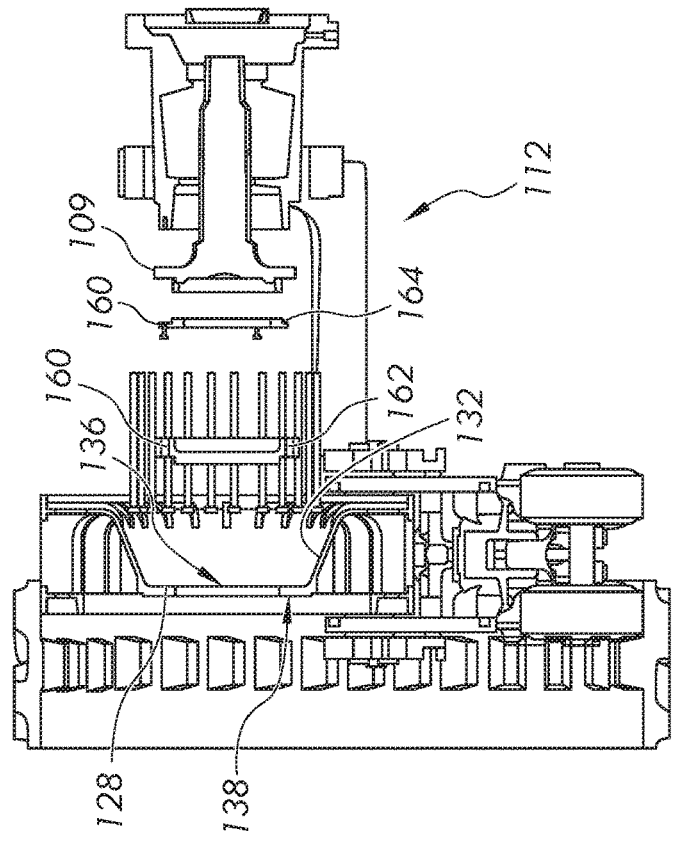
FIG. 6 is an exploded top view of the track undercarriage assembly of FIG. 5.
Figure 7:
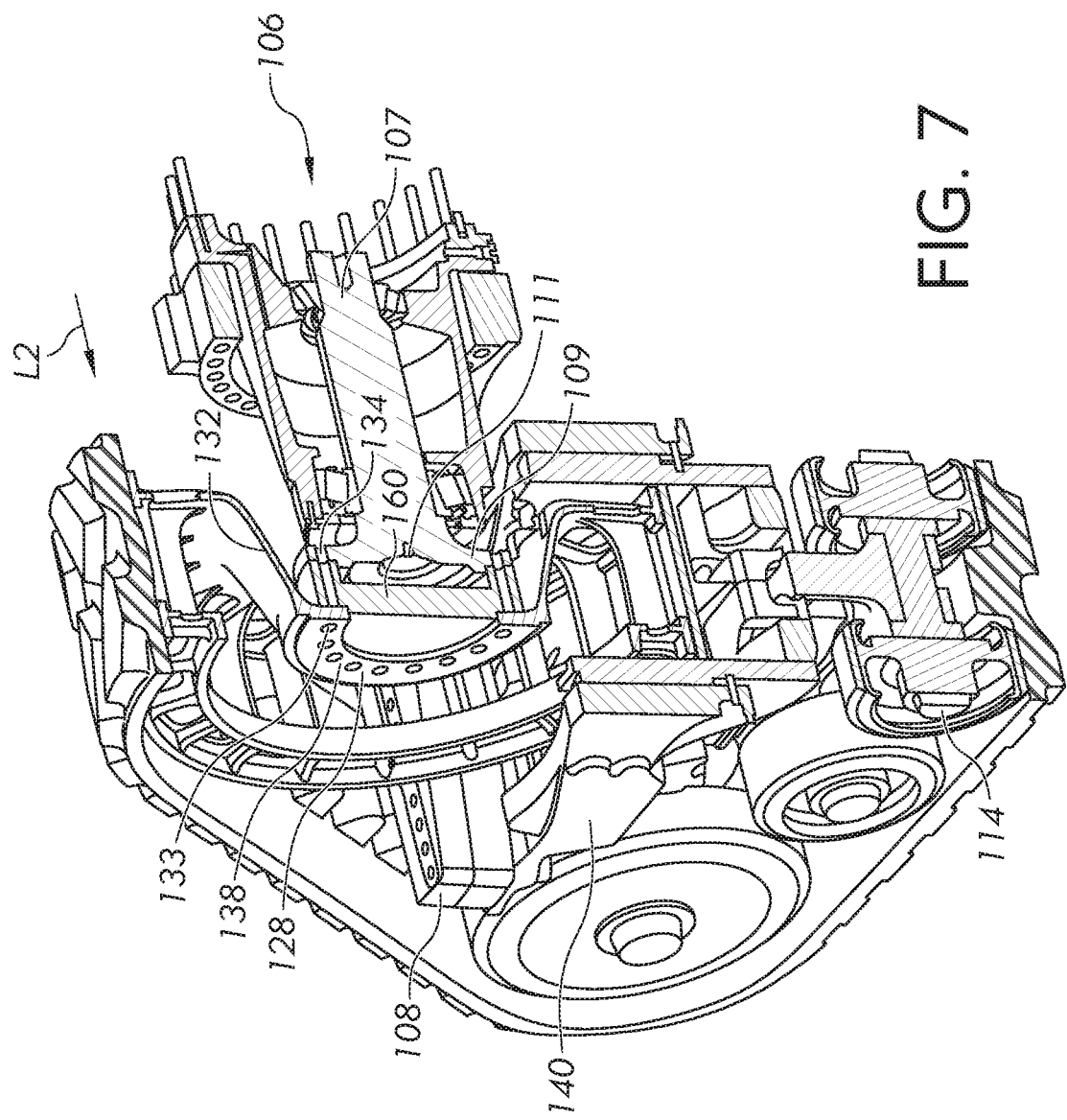
FIG. 7 is a cross-sectional view of the track undercarriage assembly of FIG. 5.

Illustrated in FIGS. 5, 6, and 7 is the second track undercarriage assembly 112 as discussed previously with a spacer ring 160 positioned between the inner ring 128 of the drive sprocket 126 and the axle flange 109 to laterally adjust the drive assembly 122 to a position that is wider or greater than the first position but less than the second position. The second track undercarriage assembly 112 is illustrated wherein the first track undercarriage assembly 110 is similar to the second track undercarriage assembly 112. The spacer ring 160 is sized to fit within the collar 132 when the collar 132 is positioned to extend towards the axle shaft 107. The spacer ring 160 can have many configurations however the illustrated embodiment includes a first ring 162 coupled or attached to a second ring 164 wherein the first ring 162 is sized to rest against the first face 136 of the inner ring 128 and the second ring 164 is sized to rest against the axle flange 109. The spacer ring 160 can have any width that is feasible to position the drive assembly 122 to a desired position. For example, the spacer ring 160 can have a width that incrementally adjusts the drive assembly 122 to a desired position.

The undercarriage assembly 120 is also laterally adjusted an amount that corresponds to the amount of adjustment of the drive assembly 122 with the spacer ring 160 assembled. Therefore, the undercarriage assembly 120 is adjusted, to a position that is wider or greater than the first position but less than the second position. The undercarriage frame 140 is moved laterally relative to the rear arm 108 such that the plurality of arm holes 142 and the plurality of undercarriage holes (not illustrated) are aligned, and the guide arm 144 and the rear arm 108 are assembled together with the plurality of fasteners (not illustrated).

As previously described, the first and second track undercarriage assemblies 110 and 112 are capable of being adjusted towards or away from the longitudinal centerline L. In other words, the track undercarriage assembly on one side of the tractor may be adjusted towards or away from the track undercarriage assembly on the opposite side thereof. As such, the width or spacing between track undercarriage assemblies 112 may be adjusted to a desired location. In doing so, the second track undercarriage assemblies 112 can be adjusted relative to the axle shaft 107 and the rear arm 108, both of which are fixedly coupled to the frame 104. The first track undercarriage assembly 110 is similarly adjusted as the second track undercarriage assembly 112.

Illustrated in FIGS. 8 and 9 is the second track undercarriage assembly 112 as discussed previously in the second position. In the second or widest position, the drive sprocket 126 is arranged such that the second face 138 of the inner ring 128 is attached to the axle flange 109. Moreover, the collar 132 extends away from the axle shaft 107 to laterally adjust the drive assembly 122 to the second position. There are no spacer rings 160 assembled with the drive sprocket 126 when the second track undercarriage assembly 112 is in the second position. The drive sprocket 126 is assembled to the axle flange 109 wherein the apertures 133 of the inner ring 128 and the apertures 134 of the axle flange 109 are arranged to align with one another to attach the inner ring 128 to the axle flange 109 with a plurality of fasteners or bolts and mount the drive sprocket 126 onto the rear axle 106. The undercarriage assembly 120 is also laterally adjusted to the second position. The guide arm 144 is moved laterally relative to the rear arm 108 such that the plurality of arm holes 142 and the plurality of undercarriage holes (not illustrated) are aligned, and the guide arm 144 and the rear arm 108 are assembled together with the plurality of fasteners (not illustrated). Moreover, the track belt 114 may be configured to be a symmetric or mirrored design of the other track belt 114 which allows for the track belts to be moved from one side of the work machine 100 to the other side of the work machine to make the largest tread setting changes as quick and possible without requiring additional parts.

Another aspect of this disclosure is the improved process for adjusting the location of the second track undercarriage assembly 112 relative to the axle shaft 107, and the ease with which the position of the track belt 114 may be adjusted. The second track undercarriage assembly 112 is illustrated wherein the first track undercarriage assembly 110 is similar to the second track undercarriage assembly 112 and adjustment of these track undercarriage assemblies is similar therefore only the adjustment of the second track undercarriage assembly 112 is discussed.

In FIGS. 1, 3, and 4, to position the second track undercarriage assembly 112 in the first position, the undercarriage assembly 120 is connected to the rear arm 108 by aligning the rear arm 108 with the guide arm 144 to guide the rear arm 108 along the guide arm 144. The plurality of arm holes 142 are aligned with the plurality of undercarriage holes (not illustrated) and the plurality of fasteners (not illustrated) are assembled through the arm holes 142 and the undercarriage holes to connect the rear arm 108 to the guide arm 144. Next the drive assembly 122 is operably attached to the rear axle 106. The first face 136 is attached to the axle flange 109 and the plurality of apertures 133 of the inner ring 128 and the plurality of apertures 134 of the axle flange 109 are arranged to align with one another to assemble the inner ring 128 to the axle flange 109. The plurality of fasteners is assembled through the plurality of apertures 133 and the plurality of apertures 134 to mount the drive sprocket 126 onto the rear axle 106. In this configuration, the collar 132 extends towards the axle shaft 107. In any configuration, the track belt 114 is assembled with the undercarriage assembly 120 and the drive assembly 122.

To position the second track undercarriage assembly 112 in a position that is wider than the first position but less than the second position, illustrated in FIGS. 5, 6, and 7, the spacer ring 160 is assembled between the first face 136 of the inner ring 128 and the axle flange 109. All other steps per FIGS. 1, 3, and 4 are the same as discussed previously.

To position the second track undercarriage assembly 112 in the second position, which is the widest position illustrated in FIGS. 2, 8, and 9, the undercarriage assembly 120 is connected to the rear arm 108 by aligning the rear arm 108 with the guide arm 144 to guide the rear arm 108 along the guide arm 144. The plurality of arm holes 142 are aligned with the plurality of undercarriage holes (not illustrated) and the plurality of fasteners (not illustrated) are assembled through the arm holes 142 and the undercarriage holes to connect the rear arm 108 to the guide arm 144. Next the drive assembly 122 is operably attached to the rear axle 106. The second face 138 is attached to the axle flange 109 and the plurality of apertures 133 of the inner ring 128 and the plurality of apertures 134 of the axle flange 109 are arranged to align with one another to assemble the inner ring 128 to the axle flange 109. The plurality of fasteners is assembled through the plurality of apertures 133 and the plurality of apertures 134 to mount the drive sprocket 126 onto the rear axle 106. In this configuration, the collar 132 extends away from the axle shaft 107. The track belt 114 is assembled with the undercarriage assembly 120 and the drive assembly 122.

Figure 10:
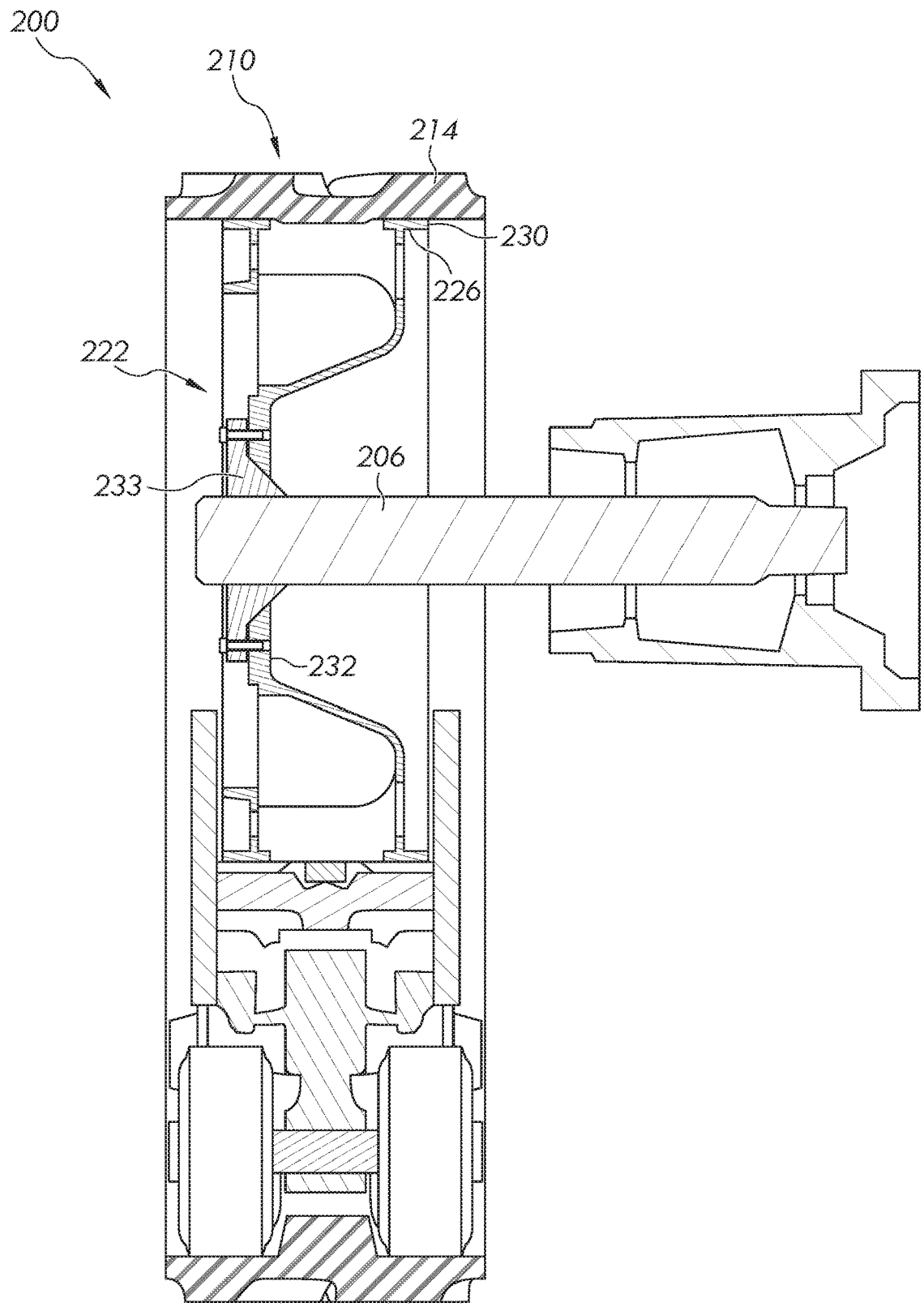
FIG. 10 is a top view of a drive assembly.

Referring now to FIG. 10, a partial top view of a work machine or tractor 200 is illustrated. The work machine 200 is similar to and includes the same components as work machine 100, unless indicated otherwise. The work machine 200 includes a frame supported by a ground-engaging mechanism 210 or track undercarriage assembly similar to the first ground-engaging mechanism or track undercarriage assembly 110, and configured for lateral adjustment.

The track undercarriage assembly 210 includes an undercarriage assembly (not illustrated) similar to undercarriage assembly 120. However, the undercarriage assembly for FIG. 10, does not include a plurality of holes on the guide arm or on the rear arm. Alternatively, the undercarriage assembly includes a tube or other similarly shaped member for the rear arm that can slide within the guide arm to adjust the location of the track undercarriage assembly 210.

The track undercarriage assembly 210 includes a drive assembly 222 operably attached to the rear axle 206 and a track belt 214 mounted on the drive assembly 222. The rear axle 206 is configured as a bar axle that does not have a flange.

The drive assembly 222 includes a drive sprocket 226. The drive sprocket 126 includes an outer ring 230 configured to rotationally drive the track belt 214 and a collar 232 that spans from the outer ring 230 to the rear axle 206. The drive assembly 222 includes one or more wedge sleeves 233 that are configured to retain the collar 232 with the rear axle 206. The wedge sleeves 233 are configured to adjust the lateral location of the drive sprocket 226 relative to the longitudinal centerline L. As the with the use of the wedge sleeves 233, the drive sprocket 226 is adjustable on the rear axle 206 to match the location of the undercarriage assembly.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A work machine, comprising:
a frame including an axle and an arm;
a track undercarriage assembly including an undercarriage assembly connected to the arm, a drive assembly operably attached to the axle, and a track belt mounted on the drive assembly;
wherein the axle includes an axle shaft and an axle flange, and the drive assembly includes a drive sprocket, wherein the drive sprocket includes an inner ring configured to attach to the axle flange, an outer ring configured to rotationally drive the track belt, and a collar that spans between the inner ring and the outer ring;
wherein the undercarriage assembly and the drive assembly are each configured for lateral adjustment relative to a longitudinal centerline of the frame from a first position to a second position;
wherein the drive assembly includes a spacer ring positioned between the inner ring of the drive sprocket and the axle flange to laterally adjust the drive assembly.

2. The work machine of claim 1, wherein the drive sprocket is assembled in a first configuration such that the collar extends towards the axle shaft to laterally adjust the drive assembly towards the first position.

3. The work machine of claim 1, wherein the spacer ring includes a first ring coupled to a second ring, wherein the first ring is sized to rest against a first face of the inner ring and the second ring is sized to rest against the axle.

4. The work machine of claim 1, wherein the spacer ring is configured to incrementally adjust the drive assembly.

5. The work machine of claim 1, wherein the track undercarriage assembly includes a first track undercarriage assembly opposite a second track undercarriage assembly, the first track belt configured to be moved to the second track location, and the second track belt configured to be moved to the first track location.

6. The work machine of claim 1, wherein the undercarriage assembly includes an undercarriage frame configured to attach to the arm of the frame, wherein the undercarriage frame and the arm are adjustably coupled to allow the undercarriage frame to be movably adjusted between the first position and the second position.

7. The work machine of claim 6, wherein the arm includes a plurality of arm holes and the undercarriage frame includes a guide arm having a plurality of undercarriage holes, and a plurality of fasteners configured to connect the arm to the guide arm through the plurality of arm holes and the plurality of the undercarriage holes to laterally adjust the position of the undercarriage frame relative to the arm.

8. A track undercarriage assembly for coupling to a frame of a work machine where the frame includes an axle and an arm, the track undercarriage assembly comprising:
a track belt;
a drive assembly configured to receive the track belt, the drive assembly configured to be adjustably connected to the arm of the frame, the drive assembly configured to be operably attached to the axle, the drive assembly configured for lateral adjustment from a first position to a second position relative to a longitudinal centerline of the work machine; and
an undercarriage assembly configured to be adjustably connected to the arm of the frame, the undercarriage assembly configured for lateral adjustment from the first positon to the second position relative to the longitudinal centerline of the work machine;
wherein the drive assembly includes a drive sprocket, wherein the drive sprocket includes an inner ring configured to attach to an axle flange of the axle, an outer ring configured to rotationally drive the track belt, and a collar that spans between the inner ring and the outer ring;
wherein the drive assembly includes a spacer ring positioned between the inner ring of the drive sprocket and the axle flange to laterally adjust the drive assembly.

9. The track undercarriage assembly of claim 8, wherein the drive sprocket is assembled in a first configuration such that the collar extends towards the axle to laterally adjust the drive assembly towards the first position.

10. The work machine of claim 8, wherein the spacer ring includes a first ring coupled to a second ring, wherein the first ring is sized to rest against a first face of the inner ring and the second ring is sized to rest against the axle.

11. The work machine of claim 8, wherein the spacer ring is configured to incrementally adjust the drive assembly.

12. The work machine of claim 8, wherein the track belt includes a first track belt opposite a second track belt, the first track belt configured to be moved to the second track belt location, and the second track belt configured to be moved to the first track belt location.

13. The track undercarriage assembly of claim 8, wherein the undercarriage assembly includes an undercarriage frame configured to attach to the arm of the frame of the work machine in a first configuration or a second configuration, wherein the undercarriage frame and the arm are adjustably coupled to allow the undercarriage frame to be movably adjusted between the first position and the second position.

14. The track undercarriage assembly of claim 13, wherein the arm includes a plurality of arm holes and the undercarriage frame includes a guide arm having a plurality of undercarriage holes, and a plurality of fasteners configured to connect the arm to the guide arm through the plurality of arm holes and the plurality of the undercarriage holes to laterally adjust the position of the undercarriage frame relative to the arm.

* * * * *